United States Patent
Mehta et al.

(10) Patent No.: US 9,480,046 B1
(45) Date of Patent: Oct. 25, 2016

(54) METHOD AND SYSTEM FOR MANAGING SIGNALING IN A WIRELESS COMMUNICATION NETWORK

(71) Applicant: Sprint Spectrum L.P., Overland Park, KS (US)

(72) Inventors: Dhaval Mehta, Herndon, VA (US); Abdul-Wahab Mirza, Sterling, VA (US); Siddhartha Chenumolu, Broadlands, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/737,163

(22) Filed: Jun. 11, 2015

(51) Int. Cl.
*H04W 68/00* (2009.01)
*H04W 68/06* (2009.01)
*H04W 68/02* (2009.01)

(52) U.S. Cl.
CPC ............ *H04W 68/06* (2013.01); *H04W 68/02* (2013.01)

(58) Field of Classification Search
USPC ........................................................ 455/458
See application file for complete search history.

(56) References Cited

U.S. PATENT DOCUMENTS

| | | | |
|---|---|---|---|
| 6,122,522 A | 9/2000 | Lee | |
| 8,204,517 B1 | 6/2012 | Rai et al. | |
| 8,437,781 B1 | 5/2013 | Oroskar et al. | |
| 8,533,809 B1 | 9/2013 | Zang et al. | |
| 8,588,728 B1 | 11/2013 | Hassan | |
| 8,838,154 B1 | 9/2014 | Singh et al. | |
| 8,843,162 B2 | 9/2014 | Oroskar et al. | |
| 8,855,686 B1 | 10/2014 | Oroskar et al. | |
| 8,954,097 B1 | 2/2015 | Oroskar | |
| 8,996,074 B1 | 3/2015 | Oroskar | |
| 2011/0077014 A1 | 3/2011 | Heavilin et al. | |
| 2012/0115515 A1* | 5/2012 | Lopez | H04W 68/04 455/458 |

OTHER PUBLICATIONS

Co-Pending U.S. Appl. No. 14/638,600, filed Mar. 4, 2015 "Method and System for Managing Signaling in a Wireless Communication Network".

* cited by examiner

*Primary Examiner* — Joel Ajayi

(57) ABSTRACT

Disclosed is a method and system for managing signaling in a communication network. A paging controller determines one or more target coverage areas to attempt a paging request for a wireless communication device (WCD) based on (i) a coverage area last serving the WCD ("last known coverage area") and (ii) an amount of time passed since the WCD last transitioned from a connected state to an idle state in the last known coverage area ("the idle duration"). The paging controller can utilize a database that specifies, on a per WCD basis, one or more records of associated data items for different last known coverage areas, idle durations, and target coverage areas. With knowledge of a last known coverage area and idle duration for a WCD, database record(s) can be identified and target coverage area(s) can be determined. A paging request can then be transmitted to the determined target coverage area(s).

20 Claims, 5 Drawing Sheets

METHOD AND SYSTEM FOR MANAGING SIGNALING IN A WIRELESS COMMUNICATION NETWORK

BACKGROUND

Unless otherwise indicated herein, the description in this section is not prior art to the claims and is not admitted to be prior art by inclusion in this section.

A typical wireless communication system includes a number of base stations each radiating to define a respective coverage area in which wireless communication devices (WCDs) such as cell phones, tablet computers, tracking devices, embedded wireless modules, and other wirelessly equipped devices, can operate. In turn, each base station may be coupled with network infrastructure that provides connectivity with one or more transport networks, such as the public switched telephone network (PSTN) and/or the Internet for instance. With this arrangement, a WCD within coverage of the system may engage in air interface communication with a base station and may thereby communicate via the base station with various remote network entities or with other WCDs served by the base station.

In practice, physical base station equipment in such a system may be configured to provide multiple coverage areas, differentiated from each other by direction, carrier frequency, or the like. For simplicity in this description, however, each coverage area may be considered to correspond with a respective base station and each base station may be considered to correspond with a respective coverage area. Thus, an arrangement where physical base station equipment provides multiple coverage areas could be considered to effectively include multiple base stations, each providing a respective one of those coverage areas.

Further, a wireless communication system may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1×RTT and 1×EV-DO), Global System for Mobile Communications (GSM), and Wi-Fi, among others. Each protocol may define its own procedures for managing communications with WCDs.

In accordance with the air interface protocol, each coverage area may operate on one or more carrier frequencies or ranges of carrier frequencies. Further, each coverage area may define a number of channels or specific resources for carrying signals and information between the base station and WCDs. For instance, on the downlink, certain resources may be used to carry a pilot or reference signal that identifies the coverage area and that WCDs may detect and measure as a basis to evaluate coverage, and other resources may be used to carry paging messages and other such control messages from the base station to WCDs. And on the uplink, certain resources may be used to carry registration requests and other control messages from WCDs to the base station. In addition, certain resources on the uplink and downlink may be set aside to carry bearer traffic (e.g., user communications) between the base station and the WCDs.

When a WCD first powers on or enters into coverage of a wireless communication system, the WCD may search for a strongest coverage area and may then register with the system by transmitting a registration message to the base station that provides that coverage area. The WCD may then operate in an idle mode or a connected (or active) mode in that coverage area. In the idle mode, the WCD may periodically monitor transmissions from the base station in search of any paging messages directed to the WCD and, upon detecting such a paging message or at the initiation of the WCD, may transmit a control message to the base station to facilitate transition to the connected mode. In the connected mode, the WCD may then engage in bearer communication, such as voice calls and/or data sessions, on air interface resources assigned by the base station. Upon completion of the bearer communication, the WCD may transition back into the idle mode.

Further, in both the idle mode and connected mode, the WCD may regularly monitor the strength of its serving coverage area and the strength of any other available coverage areas, to help ensure that the WCD operates in the best available coverage. If the WCD detects that the strength of its serving coverage area is threshold low and the strength of another coverage area is sufficiently high, and/or for other reasons, the WCD may then hand over to operate in the other coverage area. In the connected mode, this handover process would involve signaling between the WCD and the system to facilitate transfer of the WCD's connection to the new coverage area. Whereas, in the idle mode, the handover process may involve the WCD simply transitioning to idle in the new coverage area, beginning to monitor transmissions from the base station in the new coverage area in search of any paging messages directed to the WCD.

In practice, a wireless communication system may include a paging controller, such as a mobile switching center (MSC) or mobility management entity (MME), that manages paging of WCDs. As a WCD may move from coverage area to coverage area, one function of the paging controller is to track where in the wireless communication system the WCD is operating, so that when the paging controller has a paging message to send to the WCD, the paging controller can send the paging message to the appropriate base station(s) for transmission to the WCD. To facilitate this, when a WCD initially registers with the system, the WCD's registration message may pass to the paging controller, and the paging controller may store a record of the base station coverage area currently serving the WCD. Further, as the WCD moves from one coverage area to another in the idle mode, the WCD may re-register with the system by transmitting a new registration message, which may similarly pass to the paging controller, and the paging controller may update its record of which base station coverage area is serving the WCD. When the paging controller then has a page message to send to the WCD, the paging controller may send the paging message to the base station currently serving the WCD for transmission by the base station to the WCD.

OVERVIEW

A problem with the above registration and paging process is that every time a WCD moves from one coverage area to another, the paging controller would receive and process a new registration message from the WCD. In an area where WCDs frequently move between coverage areas, this registration process could thus create significant signaling and processing load at the paging controller, which could at some point overload the paging controller or cause other issues.

One solution to this problem is to implement "tracking areas" (or "paging zones"). In such an arrangement, the base station coverage areas in the system are divided into groups each defining a respective tracking area having a respective tracking area ID, and each base station in the system broadcasts its tracking area's ID. Further, the paging controller has a record of the tracking areas, so as to facilitate paging on a per-tracking-area basis. When a WCD first powers on or enters into coverage of the system and detects a strongest coverage area, the WCD notes the tracking area ID of that coverage area and registers by sending an initial "tracking-area update" (TAU) message, and the paging controller makes a record of the WCD's serving coverage area and tracking area. In turn, each time the WCD moves to a new coverage area, the WCD then determines if the tracking area ID of the new coverage area is the same as or different than the WCD's current tracking area ID, and the WCD re-registers with the system, by sending a new TAU, only if the tracking area ID is different—so as to notify the paging controller of the WCD's new serving coverage area and new tracking area.

With this tracking area arrangement, when the paging controller then has a paging message to send to a WCD, the paging controller may first attempt to page the WCD in the WCD's coverage area of last registration. Further, absent a response from the WCD to that paging message, or alternatively, the paging controller may page the WCD in all of the coverage areas of the WCD's tracking area, on grounds that the WCD may have moved to one of the other coverage areas of the tracking area but has not yet re-registered in a new tracking area.

Unfortunately, however, this tracking area arrangement can give rise to yet another problem, in that the act of paging a WCD in all coverage areas of a tracking area may include not only paging the WCD in the coverage area where the WCD is operating but also paging the WCD in possibly many other coverage areas where the WCD is not operating, thus unnecessarily burdening the downlink in those other coverage areas.

One solution to this additional problem would be to designate each coverage area in the system as a separate tracking area, so that paging would then occur only in the coverage area where the WCD is operating. However, that solution would in turn give rise to the same problem noted above, in that WCDs would re-register with the paging controller every time they move to new coverage areas, thereby burdening the paging controller with excessive registration signaling. Consequently, a further improvement is desired.

Disclosed herein is a method and system for managing signaling in a wireless communication network to help avoid or minimize issues such as those noted above. In particular, the present disclosure provides a way to efficiently predict where an idle WCD may be located (e.g., in which base station's coverage area the WCD may be located) so as to then direct a page for the WCD to that location. In accordance with the disclosure, a paging controller determines one or more target coverage areas to attempt a paging request for a particular WCD based on (i) an indication of the coverage area that was last serving the particular WCD ("the last known coverage area") and (ii) an indication of an amount of time that has passed since the particular WCD last transitioned from a connected state to an idle state in the last known coverage area ("the idle duration"). To do so, the paging controller can utilize a database that specifies for each WCD in the RAN, on a per WCD basis, one or more records of associated data items for different last known coverage areas, idle durations, and target coverage areas. For instance, each record can be a row in a table having columns for fields that include at least the last known coverage area, the idle duration, and the target coverage area. Thus, with knowledge of a last known coverage area and an idle duration for a particular WCD, one or more corresponding database records can be identified from which target coverage area(s) can be determined. The paging controller can then transmit a page request to the base station(s) providing the target coverage area(s) to cause the base station(s) to page the WCD.

According to aspects of the present disclosure, the data stored in the database can be based on activities and events observed for each WCD in the RAN, on a per WCD basis. More particularly, the paging controller (or another entity in the RAN) can identify events in which the WCD operates in the idle mode for a period of time, and populate the database with data determined based on parameters associated with the initiation and termination of such events. For instance, when the WCD moves between coverage areas in an idle state, the paging controller can store an indicator of the coverage area in which the WCD transitioned from a connected state to an idle state (i.e., the last known coverage area), an indicator of the coverage area in which the WCD next transitioned from the idle state back to the connected state (i.e., the target coverage area), and the associated idle duration (i.e., the period of time between the two state transitions for the WCD) as a record in the database. In this way, the paging controller can populate the database with data that facilitates predictive determinations of target coverage areas for future paging requests.

In one respect, disclosed is a method of managing signaling in a RAN that includes a plurality of base stations each providing a respective coverage area in which to serve WCDs. The RAN also includes a paging controller. The method includes determining, in the paging controller, that a particular WCD should be paged and, responsive to the determination that the WCD should be paged, the paging controller determining a last known coverage area for the WCD. The last known coverage area is provided by a base station in the RAN with which the WCD was communicating when the WCD last transitioned to an idle mode. The method further includes, responsive to the determination that the WCD should be paged, the paging controller determining an idle duration for the WCD. The idle duration is an amount of time that has passed since the WCD last transitioned to the idle state in the last known coverage area. The method still further includes determining, by the paging controller, one or more target coverage areas based on the determined last known coverage area and the determined idle duration. The method also includes transmitting a page request, from the paging controller to one or more base stations providing the one or more determined target coverage areas, to cause the one or more base stations to page the WCD.

In another respect, disclosed is a paging controller that includes a processing unit, a data storage, and program instructions stored in the data storage. The program instructions are executable by the processing unit to determine that a particular WCD in a RAN should be paged and determine a last known coverage area for the WCD. The last known coverage area is provided by a base station in the RAN with which the WCD was communicating when the WCD last transitioned to an idle mode. The program instructions are further executable by the processing unit to determine an idle duration for the WCD. The idle duration is an amount of time that has passed since the WCD last transitioned to the idle state in the last known coverage area. The program instructions are still further executable by the processing unit to determine one or more target coverage areas based on the determined last known coverage area and the determined idle duration. The program instructions are also executable by the processing unit to transmit a page request to one or more base stations providing the one or more determined target coverage areas to cause the one or more base stations to page the WCD.

In another respect, disclosed is a method that includes receiving, in a paging controller, a first communication identifying a particular WCD in a RAN. The first communication also includes an indication of a first time at which the WCD transitioned from a connected mode to an idle mode and an indication of a first coverage area in which the WCD made the transition at the first time. The method further includes, after receiving the first communication, receiving, in the paging controller, a second communication identifying the WCD. The second communication also includes an indication of a second time at which the WCD transitioned from the idle mode to the connected mode and indication of a second coverage area in which the WCD made the transition at the second time. The method still further includes determining, by the paging controller, an idle duration based on the difference between the second time and the first time, and storing, in a database, a record including an indication of the first coverage area, an indication of the idle duration, and an indication of the second coverage area, the record being associated with the WCD. The method also includes determining, in the paging controller, that the WCD should be paged, accessing the record in the database to make a determination, by the paging controller, where to page the WCD, and paging the WCD in accordance with the determination where to page the WCD.

In addition, features of the disclosure could be provided by a non-transitory computer-readable medium, such as a magnetic, optical, or flash storage mechanism, having encoded thereon instructions executable by a processing unit to cause the processing unit to carry out operations such as those noted above.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

I. Example Communications System

Figure 1:
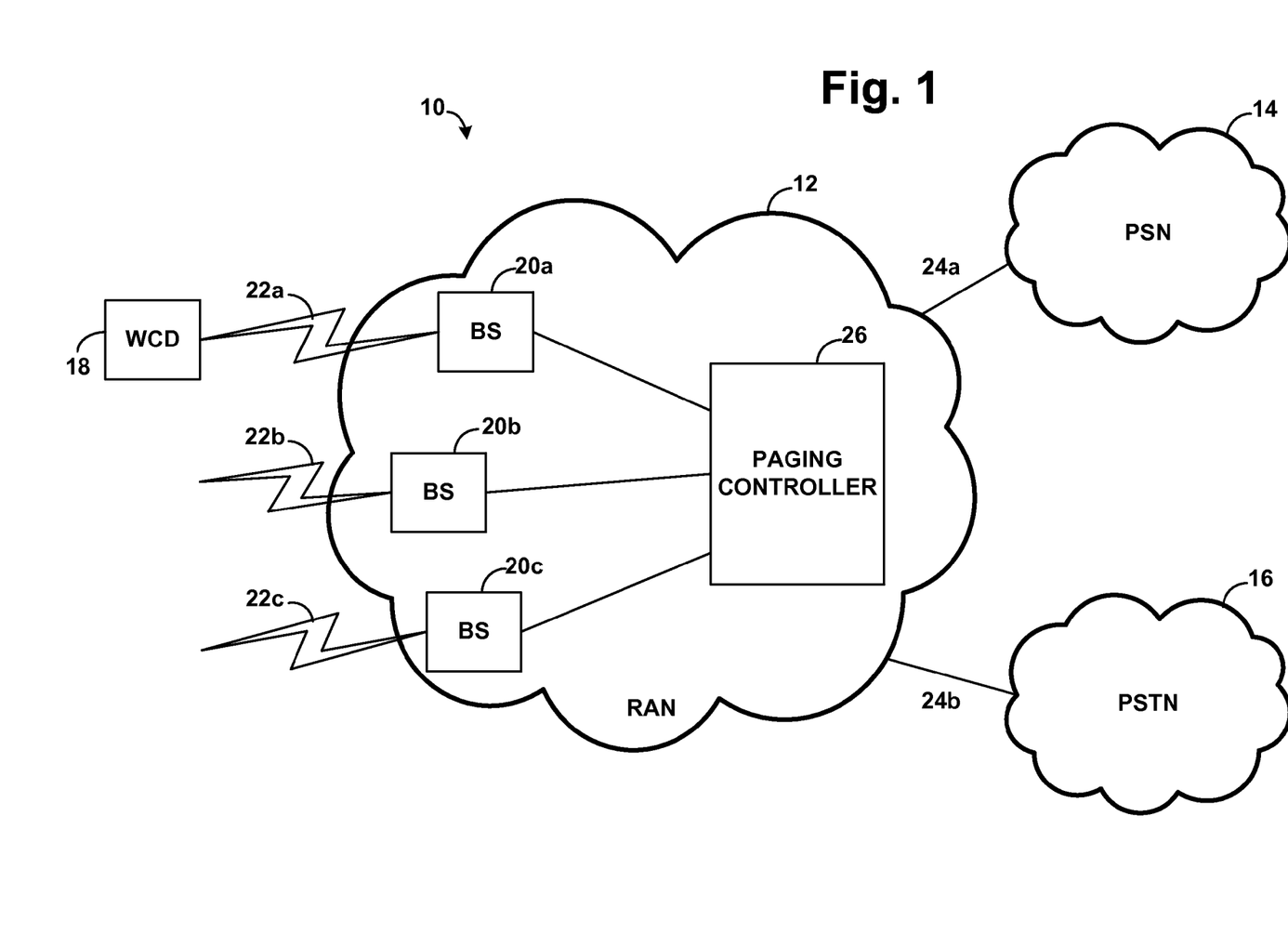
FIG. 1 is a simplified block diagram of a wireless communication system in which the present method and system can be implemented.

Referring to the drawings, FIG. 1 is a simplified block diagram of an example communications system 10 in which embodiments of the present method and system can be implemented. It should be understood, however, that the arrangement shown and described here and other arrangements and processes described in this document can take other forms. For instance, elements can be added, removed, combined, distributed, re-ordered, re-positioned, or otherwise changed. Further, features described herein as being carried out by one or more entities could be implemented by a programmed processing unit or by various other configurations, as those of ordinary skill in the art would understand.

The example communication system 10 includes a radio access network (RAN) 12, a packet-switched network (PSN) 14, a public switched telephone network (PSTN) 16, and a wireless communication device (WCD) 18. Although FIG. 1 shows the RAN 12 in wireless communication with one representative WCD 18, it should be understood that the RAN 12 can be in communication with a greater or fewer number of WCDs. Additionally, the number of WCDs in wireless communication with the RAN 12 can change over time, for example, as a result of one or more WCDs moving into or out of the wireless coverage areas of the RAN 12 and/or as a result of one or more WCDs beginning and ending communication sessions with the RAN 12. As non-limiting examples, the representative WCD 18 can be a cell phone, a tablet computer, a tracking device, an embedded wireless module, other wirelessly equipped devices, combinations thereof, and/or the like.

As shown in FIG. 1, the RAN 12 can communicate with the WCD 18 via respective air interfaces provided by a plurality of base stations, three of which are shown in FIG. 1 as base stations 20a-20c, though other quantities are possible as well. The base stations can take any of a variety of forms, compliant with any of a variety of air interface protocols such as those noted above or others now known or later developed. Depending on the air interface protocol and other factors, the base stations can also be referred to by other names, such as evolved-Node-B's (eNodeBs), access nodes (ANs), access points (APs), base transceiver stations (BTSs), or the like. Further, the base stations 20a-20c can include macro base stations of the type typically implemented by cellular wireless service providers to cover broad areas, and/or small cell base stations (e.g., femtocells, picocells, etc.) of the type typically used to cover smaller areas such as areas in homes, offices, or dense urban areas. As such, each base station would typically include an antenna structure, a transceiver, a radio that is compliant with a particular air interface protocol, and other components to facilitate general base station operation and any special operation described herein.

As shown, each representative base station 20a-20c radiates to define a respective coverage area 22a-22c. In particular, a first base station 20a radiates to define a coverage area 22a, a second base station 20b radiates to define a coverage area 22b, and a third base station 20c radiates to define a coverage area 22c. As noted above, it is possible that some of these coverage areas 22a-22c could emanate from the same physical base station equipment but could be differentiated from each other in various ways, such as by pointing in different directions or operating on different carrier frequencies for instance. For the sake of discussion as noted above, the present disclosure will treat each coverage area 22a-22c as corresponding with a respective base station 20a-20c, and vice versa, though other arrangements are possible as well. In the illustrated example, the WCD 18 is in the coverage area 22a provided by the first base station 20a.

The RAN 12 is connected to the PSN 14 and the PSTN 16 via a communication link 24a and a communication link 24b, respectively. The communication links 24a-24b can include one or more wired and/or wireless interfaces. Additionally, the communication links 24a-24b can include one or more routers, switches, and/or other devices or networks. The RAN 12 can thus provide access for the WCD 18 to the PSN 14 and/or the PSTN 16. With this arrangement, the RAN 12 can facilitate communication sessions between the WCD 18 and one or more end points connected to the PSN 14 and/or the PSTN 16 such as, for example, another WCD, a landline telephone, an email server, a Web server, a media server, a gaming server, combinations thereof, and/or the like.

To initiate such communication sessions with the WCD 18, the RAN 12 includes a paging controller 26, such as an MSC or MME, which controls paging to locate the WCD 18. As noted above, at any given time, the WCD 18 can operate in one of a number of modes. When the WCD 18 has no active data session or voice call (i.e., no assigned traffic channel), but is otherwise operational, the WCD 18 is said to be in an "idle" state or mode. While in the idle mode, the WCD 18 periodically scans the air interface for communications from the RAN 12. More specifically, the WCD 18 monitors the paging channel for page messages from its serving base station in whose coverage area the WCD 18 is operating (e.g., the first base station 20a in FIG. 1). The page messages transmitted by the base station provide the WCD 18 with information, alerts, and requests during times when the WCD 18 is not engaged in a communication (i.e., when the WCD 18 is idle). For instance, the WCD 18 may be alerted of an incoming call or other incoming communications via a page message.

The paging controller 26 is thus configured to send a paging request to one or more of the base stations 20a-20c to cause the base stations 20a-20c to send a page message to the WCD 18. However, as described above, when the WCD 18 operating in the idle mode moves from one coverage area to another coverage area without re-registering with the new serving base station, the paging controller 26 may not be aware that the base station serving the WCD 18 has changed. According to aspects of the present disclosure, the paging controller 26 initiates a paging procedure that advantageously allows the paging controller 26 to more predictably determine which base station is serving the WCD 18 in such situations and, thus, allows the paging controller 26 to more optimally utilize network resources to page the WCD 18.

According to aspects of the present disclosure, to facilitate the paging procedure, the paging controller 26 can access a database to determine a target coverage area in which the WCD 18 is likely operating based on historical data recorded for the WCD 18. In particular, the paging controller 26 can utilize a database that specifies for each WCD in the RAN, on a per WCD basis, one or more records of associated data items for different last known coverage areas, idle durations, and target coverage areas. For instance, each record can be a row in a table having columns for fields that include at least the last known coverage area, the idle duration, and the target coverage area.

Accordingly, when the paging controller 26 prepares to page the WCD 18, the paging controller 26 may access or request data for the WCD 18 from the database. Based on the data, the paging controller 26 may identify one or more target coverage areas in which the WCD 18 is likely to be located. In particular, the paging controller 26 may determine the target coverage area(s) based on the last known coverage area and the determined idle duration since the WCD 18 last transitioned to idle. Once the target coverage area(s) are identified, the paging controller 26 may then transmit a paging request to the base station(s) providing the determined target coverage area(s) to cause the base station(s) to transmit a paging message for the WCD 18. The operation of the paging controller 26 is described in further detail below.

II. Provision of Communication System

As noted above, the communication system 10 can employ a database to facilitate determinations, by the paging controller 26, of target coverage area(s) and associated base station(s) to which a paging message is sent for paging the WCD. For simplicity, example systems and processes are described for implementations in which the database is stored in a memory of the paging controller 26; however, according to additional or alternative aspects of the present disclosure, the database can be stored in a memory associated with another entity (e.g., a base station) accessible to the paging controller 26 within the RAN 12. The database stores data for each WCD in the RAN 12 that specifies, on a per WCD basis, one or more records that each associate at least (i) an indication of a last known coverage area, (ii) an indication of an idle duration, and (iii) an indication of a target coverage area in which the WCD is likely located based on the last known coverage area and the idle duration.

As one non-limiting example, the database can be structured as a table including one or more records as rows and fields for at least the last known coverage area, idle duration, and target coverage area as columns. The table can also include a field for identifying the particular WCD in the RAN 12 that is associated with each record. Table 1 below shows an example portion of one such table.

TABLE 1

| WCD | Last-Known Coverage Area | Idle Duration | Target Coverage Area |
|---|---|---|---|
| WCD 1 | Coverage Area 1 | 10 minutes | Coverage Area 3 |
| WCD 1 | Coverage Area 1 | 20 minutes | Coverage Area 5 |
| WCD 1 | Coverage Area 2 | 10 minutes | Coverage Area 2 |
| WCD 1 | Coverage Area 2 | 15 minutes | Coverage Area 3 |
| WCD 1 | Coverage Area 2 | 30 minutes | Coverage Area 4 |
| WCD 1 | Coverage Area 2 | 30 minutes | Coverage Area 5 |
| WCD 1 | Coverage Area 2 | 40 minutes | Coverage Area 5 |
| WCD 2 | Coverage Area 1 | 10 minutes | Coverage Area 4 |
| WCD 2 | Coverage Area 1 | 20 minutes | Coverage Area 5 |

This table and the information therein may take various other forms as well.

According to aspects of the present disclosure, the database is populated with such data based on activities and events observed for each WCD in the RAN 12, on a per WCD basis. For instance, when a WCD moves from the coverage area of one base station to the coverage area of another base station in the idle mode, the paging controller 26 can identify such events and record relevant information in the database for the WCD. More generally, the paging controller 26 can identify events in which the WCD operates in the idle mode for a period of time ("idle events") and populate the database with data determined based on parameters associated with the initiation and termination of such idle events. In this way, the database can be dynamically determined for each WCD in the RAN 12.

Figure 2:
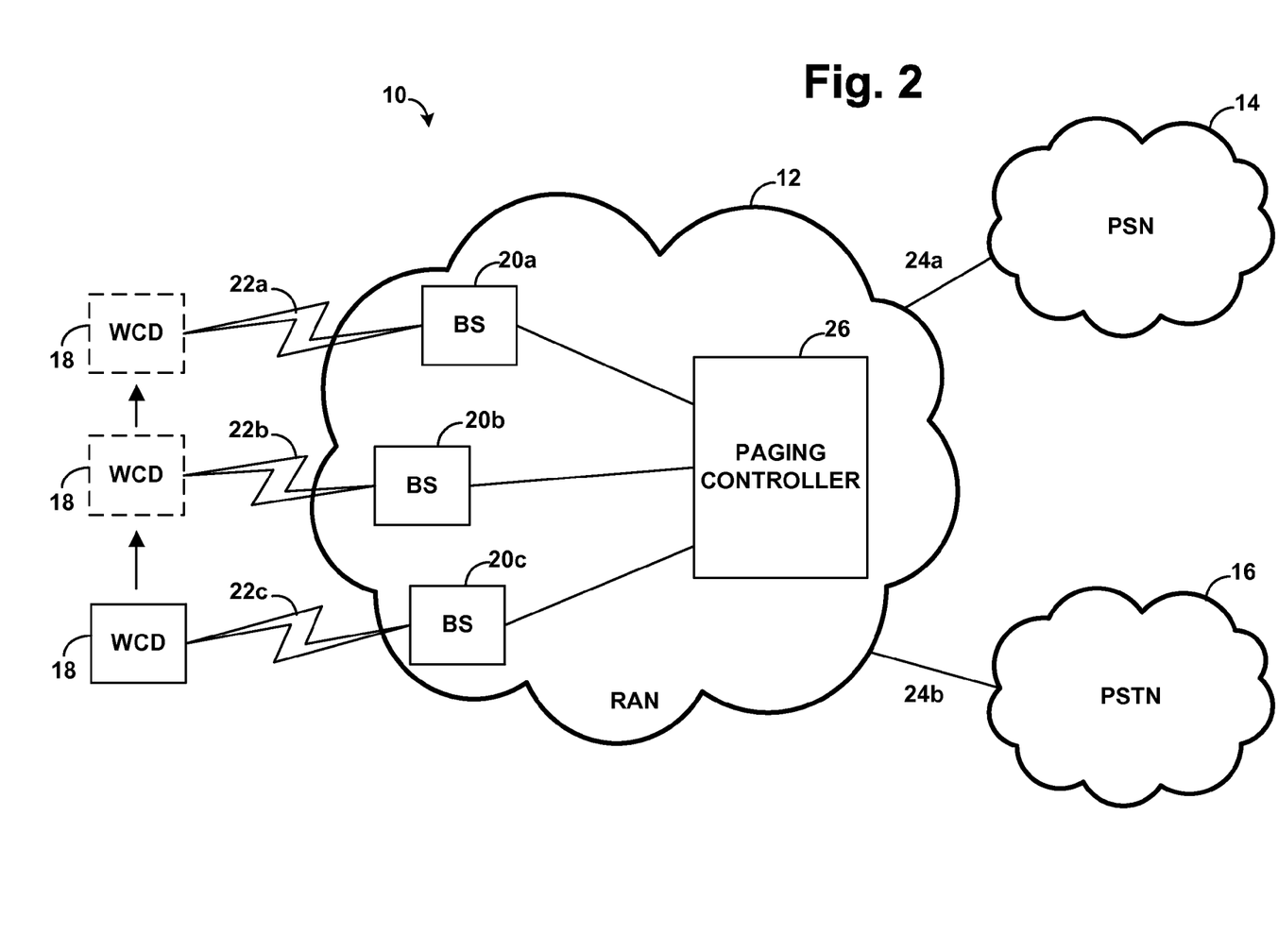
FIG. 2 is another simplified block diagram of a wireless communication system in which the present method and system can be implemented.

To further illustrate how data can be determined for the database, FIG. 2 illustrates a simplified block diagram of the communication system 10 for one example idle event that may be observed and recorded by the paging controller 26. While the illustrated example of FIG. 2 will be described in the context of the paging controller 26 receiving and storing the data for the database, it should be understood that another entity within the RAN 12 (accessible to the paging controller 26) can receive and store the data for the database according to other examples.

In this example, the WCD 18 initially engages in bearer communication with the third base station 20c while in the connected mode. Upon the completion of the bearer communication, the third base station 20c sends the WCD 18 to the idle mode at a first time $t_1$, for example, via radio resource control (RRC) signaling. The third base station 20c may then notify the paging controller 26 (e.g., via S1-Application Protocol signaling) that the WCD 18 transitioned from the connected mode to the idle mode in the coverage area 22c of the third base station 22c at the time $t_1$.

In the illustrated example, the WCD 18 then moves to another coverage area sometime after transitioning to the idle mode. More particularly, in FIG. 2, the WCD 18 is shown in the coverage area 22c of the third base station 20c and moving progressively into the coverage area 22b of the second base station 20b and then into the coverage area 22a of the first base station 20a. The progressive movement of the WCD 18 between the coverage areas 22a-22c of the base stations 20a-20c could result from physical movement of the WCD 18 from one coverage area to another and/or from changes in radio frequency (RF) conditions in particular coverage areas, leading to changes in signal strength or other factors that trigger WCD transition from one coverage area to another. For sake of discussion, we can assume that the WCD 18 operates in the idle mode as it transitions from the coverage area 22c to the coverage area 22b and then to the coverage area 22a. As a result, the paging controller 26 may not know the specific coverage area 22a-22c in which the WCD 18 is located at a given time as it transitions between the coverage areas 22a-22c.

At a second time $t_2$, after the WCD 18 moved to the coverage area 22a of the first base station 20a, the WCD 18 transitions back from the idle mode to the connected mode. For instance, the WCD 18 may transition back to the connected mode in response to a page message transmitted by the first base station 20a and/or at the initiation of the WCD 18. The first base station 20a may then notify the paging controller 26 (e.g., via S1-Application Protocol signaling and/or RRC signaling) that the WCD 18 transitioned from the idle mode to the connected mode in the coverage area 22a of the first base station 20a at the time $t_2$.

With knowledge of the transitions at time $t_1$ and time $t_2$, the paging controller 26 can determine the idle duration for the WCD 18 by determining the difference between the second time $t_2$ and the first time $t_1$. The paging controller 26 may then store, as a record associated with the particular WCD 18 in the database, an indication of the third base station 20c in the field for the last known coverage area, an indication of the determined idle duration in the field for the idle duration, and an indication of the first base station 20c in the field for the target coverage area.

Although FIG. 2 illustrates an example idle event in which the WCD 18 moved between different coverage areas while operating in the idle mode, the paging controller 26 may also record information for idle events in which the WCD 18 remains in the same coverage area according to additional or alternative aspects of the present disclosure. In such instances, the database may include one or more records in which the last known coverage area is the same as the target coverage area.

Figure 3:
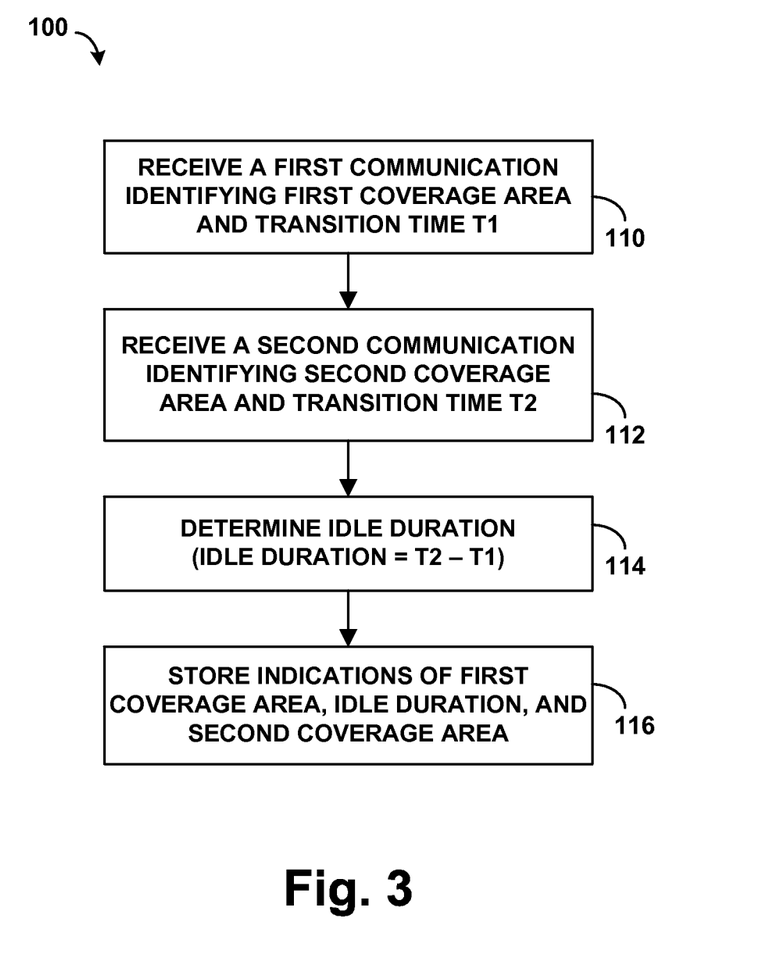
FIG. 3 is a flowchart depicting example operations in accordance with the disclosure.

Referring now to the flowchart of FIG. 3, an example process 100 for provisioning a system 10 with a database that may be utilized in a paging procedure is illustrated according to some aspects of the present disclosure. At step 110, the paging controller 26 receives a first communication including at least an indication identifying a particular WCD in the RAN 12, an indication of a time $t_1$ at which the WCD transitioned from the connected mode to the idle mode, and an indication of a first coverage area in which the WCD made such transition at time $t_1$. The first communication can be transmitted by, for example, the base station providing the first coverage area. At step 112, the paging controller 26 receives a second communication including at least an indication identifying the same WCD, an indication of a time $t_2$ at which the WCD transitioned from the idle mode to the connected mode, and an indication of a second coverage area in which the WCD made such transition at time $t_2$. The second communication can be transmitted by, for example, the base station providing the second coverage area.

At step 114, the paging controller 26 determines an idle duration for the WCD based on the information received via the first communication and the second communication. In particular, the idle duration is determined as the difference between the time $t_2$ and the time $t_1$. Thus, the idle duration provides an indication of the amount of time that the WCD operated in the idle mode between the transitions at time $t_1$ and time $t_2$. At step 116, the paging controller 26 stores, as a record associated with the identified WCD in the database, the indication of the first coverage area in the last known coverage area field, the idle duration determined at step 114 in the idle duration field, and the indication of the second coverage area in the target coverage area field. This process 100 may be repeated for subsequent idle events.

FIG. 3, described by way of example above, represents one process that corresponds to at least some instructions executed by one or more processor(s) to perform the above described functions associated with the described concepts. It is also within the scope and spirit of the present disclosure to omit steps, include additional steps, and/or modify the order of steps presented above.

For example, according to alternative aspects of the present disclosure, the process 100 can include an additional step between the step 112 and the step 114 at which the paging controller 26 can decide whether to record data in the database based on information received via the first communication and the second communication. For instance, according to such alternative aspects, the paging controller 26 may be configured to record data in the database for only certain types of idle events. As one non-limiting example, the paging controller 26 may record data in the database only if it is determined that the WCD moved from one coverage area to another while operating in the idle mode (i.e., if it is determined that the first coverage area and the second coverage area are different). Accordingly, in this example, the database may not contain records in which the last known coverage area and the target coverage area are the same. Such a database may be used, for example, in implementations in which the paging controller 26 first pages the last known coverage area before accessing the database to determine a target coverage area.

As another example, according to additional or alternative aspects of the present disclosure, the storing of data at step 116 can be modified such that portions of the record are stored as they are received. In particular, for example, the paging controller 26 can be configured to store data received from the first communication in a partial record in the database prior to receiving the second communication at step 112. For instance, in response to the first communication, the paging controller 26 may store an indication of the last known coverage area and the time $t_1$ in the database. Storing such data in a partial record may assist in facilitating aspects of the paging procedure described below. The record may then be completed by the paging controller 26 once the second communication is received and processed as described above.

III. Example Operation of Communication System

Figure 4:
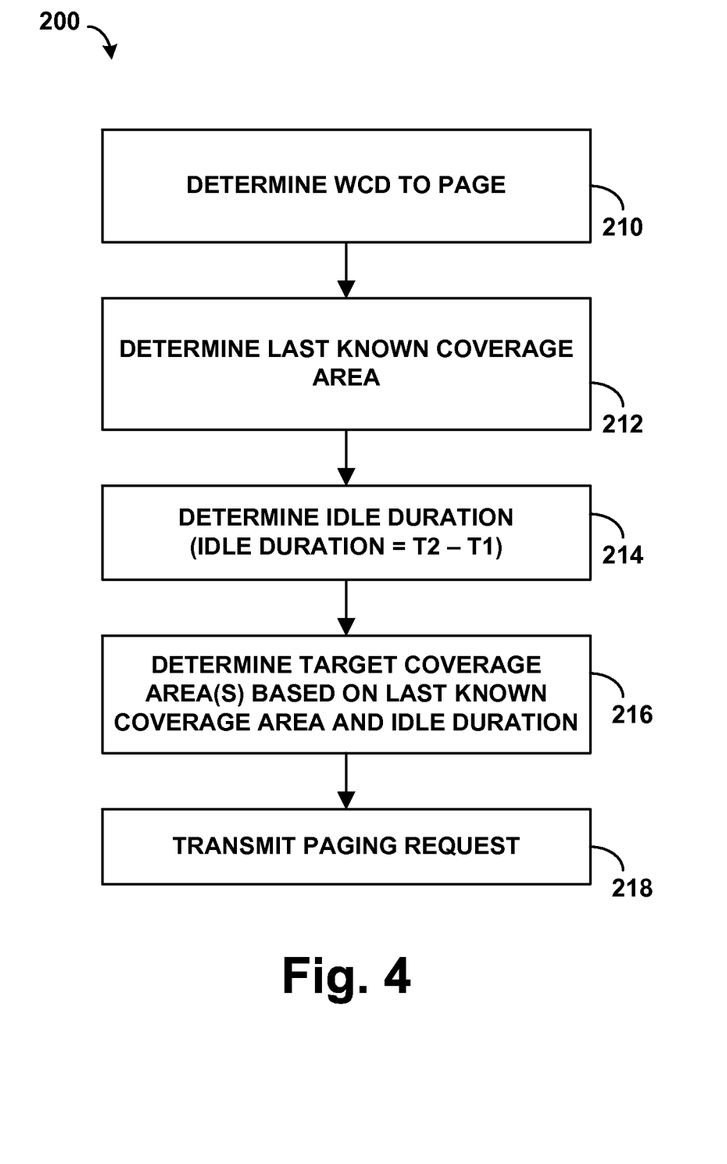
FIG. 4 is another flowchart depicting example operations in accordance with the disclosure.

FIG. 4 is a flowchart for an example process 200 of operating the communication system 10 to implement a paging procedure according to some aspects of the present disclosure. At step 210, the paging controller 26 determines that a particular WCD 18 in the RAN 12 should be paged. The paging controller 26 may be operable to page the WCD 18 for various reasons. For example, when the WCD 18 is operating in the idle mode, the paging controller 26 may receive an indication of an incoming communication directed to the WCD 18, or otherwise determine that communication with the WCD 18 is desired.

At step 212, in response to determining that the WCD 18 should be paged, the paging controller 26 determines the last known coverage area for the WCD 18 and a time $t_1$ at which the WCD 18 last transitioned from the connected mode to the idle mode in the last known coverage area. According to some aspects of the present disclosure, the paging controller 26 may identify the last known coverage area and the time $t_1$ from a partial record stored in the database as described above. For example, if the process 300 described above is being employed, the paging controller 26 may have received and stored an indication of the last known coverage area and an indication of the time $t_1$. For other examples, in which another entity in the RAN 12 maintains the database, the paging controller 26 may request the last known coverage area and the time $t_1$ from such entity. According to additional or alternative aspects, the last known coverage area and the time $t_1$ can be obtained from a home subscriber server (HSS) in an LTE system or, for other air interface protocols, a home location register (HLR) and/or a visitor location register (VLR) that maintains information about the WCD 18 such as, for example, account information, preferences, and/or a last-known location for instance. Other examples are possible as well.

At step 214, the paging controller 26 then determines an idle duration for the WCD 18. In particular, the paging controller 26 can determine the idle duration for the WCD 18 by determining the amount of time that has passed since the time $t_1$ at which the WCD 18 last transitioned from the connected mode to the idle mode. For example, the paging controller 26 can include a clock, which specifies a current clock time, so that the paging controller 26 can determine the idle duration by taking the difference between the current clock time and the time $t_1$.

At step 216, the paging controller 26 then accesses the database to determine one or more target coverage areas based on the last known coverage area determined at step 212 and the idle duration determined at step 214. For example, the paging controller 26 can search the database to identify one or more records associated with the WCD 18 that each (i) matches the last known coverage area and (ii) matches and/or approximates the determined idle duration. According to some aspects, the determined idle duration need not exactly match the idle duration stored in the record. For example, a tolerance range can be employed to identify one or more records that have approximately the same idle duration as the idle duration determined at step 214. In some of such examples, it may be possible that multiple records can be identified at step 216. In other examples, the paging controller 26 can identify only a single record at step 216, e.g., by determining the record that most closely approximates the determined idle duration. Thus, according to various aspects and implementations of the present disclosure, the paging controller 26 may identify a single target coverage area and/or multiple target coverage areas at step 216.

After the paging controller 26 identifies the target coverage area(s) at step 216 based on the last known coverage area determined at step 212 and the idle duration determined at step 214, the paging controller 26 transmits a paging request to the base station(s) associated with the determined target coverage area(s) at step 218 to cause the base station(s) to transmit a paging message over the paging channel of the downlink. Upon receipt of the paging message, the WCD 18 may transition to the connected mode to engage in bearer communication.

FIG. 4, described by way of example above, represents one process that corresponds to at least some instructions executed by one or more processor(s) to perform the above described functions associated with the described concepts. It is also within the scope and spirit of the present disclosure to omit steps, include additional steps, and/or modify the order of steps presented above. For example, according to additional or alternative aspects, the process 200 can include an additional step in which the paging controller 26 attempts to page the WCD at the last known coverage area before determining target coverage area(s) at step 216.

As another example, according to additional or alternative aspects, the process 200 can include an additional step to determine whether the paging at step 218 was successful (i.e., whether a paging message successfully reached the intended WCD 18). This may be determined, for example, based on whether the WCD 18 responds to the paging message transmitted by the base station providing the target coverage area. If it is determined that the paging message successfully reached the WCD 18, then the process 200 may terminate; however, if it is determined that the paging message did not reach the WCD 18, then the process 200 may return to step 214 to recalculate the idle duration, determine target coverage area(s) at step 216 based on the recalculated idle duration, and attempt another paging message at step 218. According to some implementations, the process 200 can be modified so that a greater number of target coverage areas are identified at step 216 for each successive paging attempt. For example, the tolerance range used to identify records in the database can be increased with each successive paging attempt. By increasing the tolerance range, the paging controller 26 may be more likely to identify a greater number of records and, thus, target coverage areas for each successive paging attempt.

IV. Example Paging Controller

Figure 5:
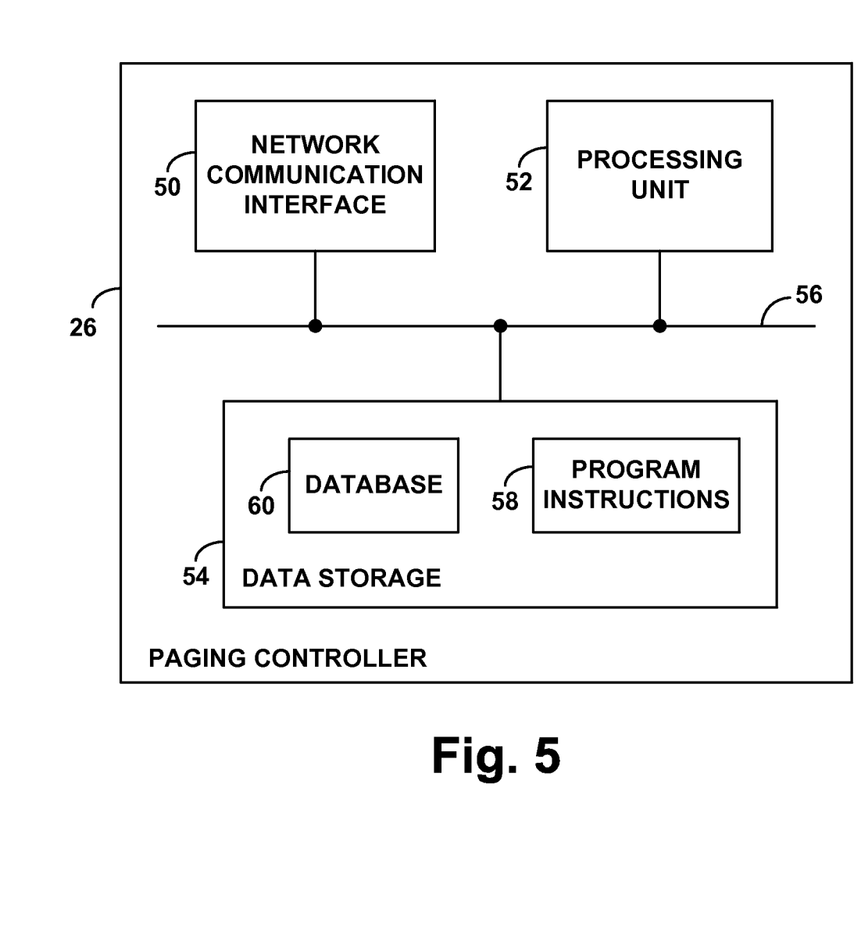
FIG. 5 is a simplified block diagram of an example paging controller operable in accordance with the disclosure.

FIG. 5 is a simplified block diagram for an example paging controller 26, showing some of the components that such a paging controller may have to facilitate operations such as those described above. As shown in FIG. 5, the example paging controller includes a network interface 50, a processing unit 52, and a data storage 54. These components may be integrated together in various ways or communicatively coupled together by a system bus, network, or other connection mechanism 56.

Network communication interface 50 may comprise a wired or wireless connection interface or other module that enables the paging controller 26 to communicate with other network nodes (e.g., base stations) such as those discussed above. Processing unit 52 may then comprise one or more general purpose processors (e.g., microprocessors) and/or one or more special purpose processors (e.g., digital signal processors, application specific integrated circuits, etc.). The data storage 54 may comprise one or more volatile and/or non-volatile storage components, particularly non-transitory computer readable medium, such as magnetic, optical, or flash storage.

As shown, data storage 54 may then store program instructions (e.g., machine language instructions or other types of instructions) 58 executable by processing unit 52 to carry out various operations described herein. For instance, the program instructions may be executable to provide the functionality of the paging controller 26 described herein. In particular, the program instructions may be executable to implement one or more of the steps of the process 100 or the process 200 described above.

Additionally, as shown, the data storage 54 can store the database 60 accessed by the paging controller 26 to implement the paging controller functionalities described above, including the functionalities involved in the process 100 and/or the process 200. As noted above, the database 60 can be stored in other entities in the RAN 12 (e.g., one or more base stations) according to additional or alternative aspects of the present disclosure.

Exemplary embodiments have been described above. Those skilled in the art will understand, however, that changes and modifications may be made to these embodiments without departing from the true scope and spirit of the invention.

What is claimed is:

1. A method of managing signaling in a radio access network (RAN), wherein the RAN includes a plurality of base stations each providing a respective coverage area in which to serve wireless communication devices (WCDs), and wherein the RAN includes a paging controller, the method comprising:

determining, in the paging controller, that a particular WCD should be paged;

responsive to the determination that the WCD should be paged, the paging controller determining a last known coverage area for the WCD, the last known coverage area being provided by a base station in the RAN with which the WCD was communicating when the WCD last transitioned to an idle mode;

responsive to the determination that the WCD should be paged, the paging controller determining an idle duration for the WCD, the idle duration being an amount of time that has passed since the WCD last transitioned to the idle state in the last known coverage area;

determining, by the paging controller, one or more target coverage areas based on the determined last known coverage area, the determined idle duration, and data regarding past activities of the WCD; and transmitting a page request, from the paging controller to one or more base stations providing the one or more determined target coverage areas, to cause the one or more base stations to page the WCD.

2. The method according to claim 1, wherein the determining the one or more target coverage areas comprises:

accessing a database including a plurality of records associated with the WCD, each record including an indication of a respective one of a plurality of last known coverage areas, an indication of a respective one of a plurality of idle durations, and an indication of a respective one of a plurality of target coverage areas; and identifying one or more of the plurality of records based on the determined last known coverage area and the determined idle duration, the determined one or more target coverage areas being determined from the identified one or more records.

3. The method according to claim 2, wherein the identifying the one or more records comprises determining which of the plurality of records each contains (i) an indication of last known coverage area that matches the determined last known coverage area and (ii) an indication of idle duration that approximates the determined idle duration.

4. The method according to claim 3, wherein the determining which of the plurality of records contains the indication of idle duration that approximates the determined idle duration comprises determining which indications of idle duration are within a tolerance range of the determined idle duration.

5. The method according to claim 4, further comprising:

responsive to transmitting the page request, determining if the WCD was successfully paged by the one or more base stations providing the determined one or more target coverage areas; and responsive to a determination that the WCD was not successfully paged, determining an updated idle duration based on an updated clock time, determining one or more additional target coverage areas based on the last known coverage area and the updated idle duration, and transmitting the page request to the one or more additional target coverage areas, the updated clock time being based on an amount of time that has passed since the idle duration was last determined.

6. The method according to claim 5, further comprising increasing the tolerance range after each unsuccessful paging attempt.

7. The method according to claim 2, wherein the plurality of records is based on the data regarding the past activities of the WCD.

8. The method according to claim 2, wherein the database is stored by another entity in RAN, and the determining the last known coverage area includes requesting the last known coverage area from the other entity in the RAN.

9. The method according to claim 1, wherein the database is stored in a data storage of the paging controller.

10. The method according to claim 1, further comprising transmitting the page request to the base station providing the last known coverage area prior to determining the one or more target coverage areas.

11. The method according to claim 1, wherein the paging controller is a mobility management entity (MME) and the RAN is an Orthogonal Frequency Division Multiple Access (OFDMA) network.

12. A paging controller, comprising:

a processing unit;

a data storage; and program instructions stored in the data storage and executable by the processing unit to:

(i) determine that a particular wireless communication device (WCD) in a radio access network (RAN) should be paged, (ii) determine a last known coverage area for the WCD, the last known coverage area being provided by a base station in the RAN with which the WCD was communicating when the WCD last transitioned to an idle mode, (iii) determine an idle duration for the WCD, the idle duration being an amount of time that has passed since the WCD last transitioned to the idle state in the last known coverage area, (iv) determine one or more target coverage areas based on the determined last known coverage area, the determined idle duration, and data regarding past activities of the WCD, and (v) transmit a page request to one or more base stations providing the one or more determined target coverage areas to cause the one or more base stations to page the WCD.

13. The paging controller according to claim 12, wherein the program instructions are further executable by the processing unit to:

access a database including a plurality of records associated with the WCD, each record including an indication of a respective one of a plurality of last known coverage areas, an indication of a respective one of a plurality of idle durations, and an indication of a respective one of a plurality of target coverage areas; and identify one or more of the plurality of records based on the determined last known coverage area and the determined idle duration, the determined one or more target coverage areas being determined from the identified one or more records.

14. The paging controller according to claim 13, wherein the database is stored in the data storage.

15. The paging controller according to claim 13, wherein, to identify the one or more records, the program instructions are further executable by the processing unit to determine which of the plurality of records each contains (i) an indication of last known coverage area that matches the determined last known coverage area and (ii) an indication of idle duration that approximates the determined idle duration.

16. The paging controller according to claim 13, wherein the plurality of records are based on the data regarding the past activities of the WCD.

17. The paging controller according to claim 12, wherein the program instructions are further executable by the processing unit to transmit the page request to the base station providing the last known coverage area prior to determining the one or more target coverage areas.

18. The paging controller according to claim 13, wherein the database is stored by another entity in RAN and, to determine the last known coverage area, the program instructions are further executable by the processing unit to request the last known coverage area from the another entity in the RAN.

19. The paging controller according to claim 1, wherein the paging controller is a mobility management entity (MME) and the RAN is an Orthogonal Frequency Division Multiple Access (OFDMA) network.

20. A method comprising:

receiving, in a paging controller, a first communication identifying a particular wireless communication device (WCD) in a radio access network (RAN) and including an indication of a first time at which the WCD transitioned from a connected mode to an idle mode and an indication of a first coverage area in which the WCD made the transition at the first time;

after receiving the first communication, receiving, in the paging controller, a second communication identifying the WCD and including an indication of a second time at which the WCD transitioned from the idle mode to the connected mode and indication of a second coverage area in which the WCD made the transition at the second time;

determining, by the paging controller, an idle duration based on the difference between the second time and the first time;

storing, in a database, a record including an indication of the first coverage area, an indication of the idle duration, and an indication of the second coverage area, the record being associated with the WCD;

determining, in the paging controller, that the WCD should be paged;

accessing the record in the database to make a determination, by the paging controller, where to page the WCD; and paging the WCD in accordance with the determination where to page the WCD.

\* \* \* \* \*